US010452919B2

(12) United States Patent
Kansara

(10) Patent No.: US 10,452,919 B2
(45) Date of Patent: Oct. 22, 2019

(54) DETECTING SEGMENTS OF A VIDEO PROGRAM THROUGH IMAGE COMPARISONS

(71) Applicant: NETFLIX, INC., Los Gatos, CA (US)

(72) Inventor: Apurvakumar Kansara, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/669,949

(22) Filed: Aug. 6, 2017

(65) Prior Publication Data

US 2017/0337427 A1 Nov. 23, 2017

Related U.S. Application Data

(63) Continuation of application No. 15/228,143, filed on Aug. 4, 2016, now Pat. No. 9,727,788, which is a (Continued)

(51) Int. Cl.
*G06K 9/00* (2006.01)
*G11B 27/00* (2006.01)
(Continued)

(52) U.S. Cl.
CPC ..... *G06K 9/00744* (2013.01); *G06K 9/00758* (2013.01); *G06K 9/4652* (2013.01);
(Continued)

(58) Field of Classification Search
CPC .......... G06K 9/00744; G06K 9/00758; G06K 9/4652; H04N 21/6547; H04N 21/23418; H04N 21/458
See application file for complete search history.

(56) References Cited

U.S. PATENT DOCUMENTS

| 8,406,607 B2 * | 3/2013 | Nesvadba ...... H04N 21/234363 386/259 |
| 9,418,296 B1 | 8/2016 | Kansara |

(Continued)

FOREIGN PATENT DOCUMENTS

| JP | H06-36026 A | 2/1994 |
| JP | 2000-004423 A | 1/2000 |

(Continued)

OTHER PUBLICATIONS

International Search Report for PCT/US2016/017528, dated May 10, 2016, 13 pages.

(Continued)

*Primary Examiner* — Huy T Nguyen
(74) *Attorney, Agent, or Firm* — Artegis Law Group, LLP

(57) ABSTRACT

In an embodiment, a data store storing a first image and a second image; a computer processor coupled to the data store and programmed to: generate a first fingerprint of the first image based on a first plurality of pixels from the first image stored in the data store; generate a second fingerprint of the second image based on a second plurality of pixels from the second image stored in the data store; determine a closeness value between the first fingerprint and the second fingerprint; determine, based on the closeness value, whether the first image matches the second image.

20 Claims, 6 Drawing Sheets

Related U.S. Application Data continuation of application No. 14/660,894, filed on Mar. 17, 2015, now Pat. No. 9,418,296.

(51) Int. Cl.

| | | |
|---|---|---|
| *G11B 27/34* | (2006.01) | |
| *G06K 9/46* | (2006.01) | |
| *H04N 21/234* | (2011.01) | |
| *H04N 21/458* | (2011.01) | |
| *H04N 21/6547* | (2011.01) | |

(52) U.S. Cl.
CPC ............ *G11B 27/005* (2013.01); *G11B 27/34* (2013.01); *H04N 21/23418* (2013.01); *H04N 21/458* (2013.01); *H04N 21/6547* (2013.01)

(56) References Cited

U.S. PATENT DOCUMENTS

| | | | |
|---|---|---|---|
| 2006/0271947 A1 | 11/2006 | Lienhart et al. | |
| 2008/0154908 A1 | 6/2008 | Datar et al. | |
| 2008/0285890 A1* | 11/2008 | Han | G06K 9/00087 382/305 |
| 2009/0175538 A1 | 7/2009 | Bronstein et al. | |
| 2009/0254757 A1* | 10/2009 | Toyama | G10L 17/10 713/186 |
| 2010/0146569 A1 | 6/2010 | Janardhan | |
| 2010/0290667 A1 | 11/2010 | Lienhart et al. | |
| 2012/0106854 A1* | 5/2012 | Tang | G06K 9/62 382/224 |
| 2018/0005188 A1* | 1/2018 | Baldwin | G06Q 50/01 |

FOREIGN PATENT DOCUMENTS

| | | |
|---|---|---|
| JP | 2000-250944 A | 9/2000 |
| JP | 2002-290763 A | 10/2002 |
| JP | 2007-048379 A | 2/2007 |
| JP | 2008-193585 A | 8/2008 |
| JP | 2009-60540 A | 3/2009 |
| JP | 2010-278790 A | 12/2010 |
| JP | 2012-80354 A | 4/2012 |
| JP | 2012-175478 A | 9/2012 |
| JP | 2012-242297 A | 12/2012 |
| JP | 2012-244446 A | 12/2012 |
| WO | 2007/000959 A1 | 1/2007 |
| WO | 2008062145 A1 | 5/2008 |
| WO | 2011/021289 A1 | 2/2011 |

OTHER PUBLICATIONS

Notice of Allowance for U.S. Appl. No. 14/660,894, dated Apr. 12, 2015, 7 pages.

Daiki Kudo, et al., "Video Identifying Technology 'Video Signature' and Applied Techniques Thereof" Mitsubishi Electric Technical Report, Mitsubishi Electric Engineering, Jul. 20, 2014, vol. 88, No. 7, pp. 43-46.

* cited by examiner

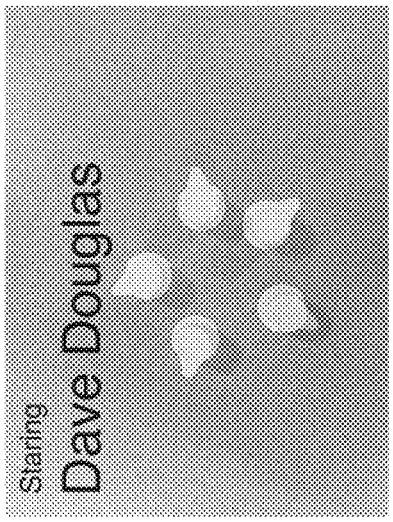 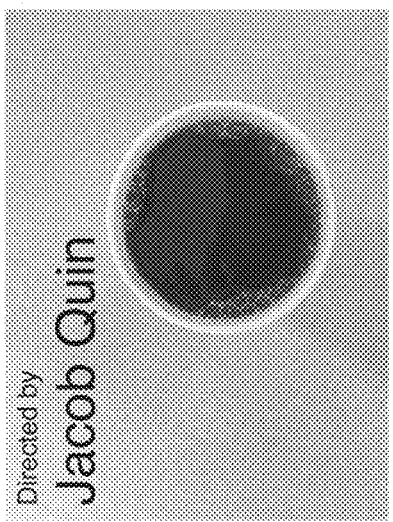 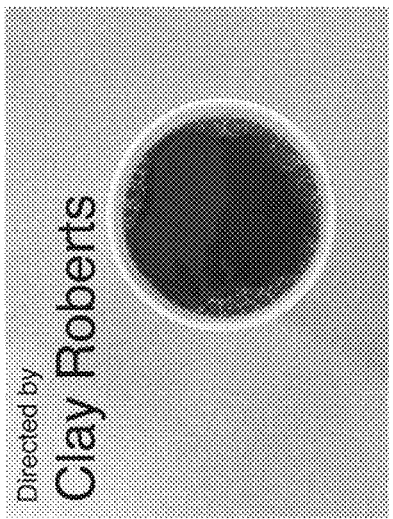
FIG. 1A    FIG. 1B    FIG. 1C
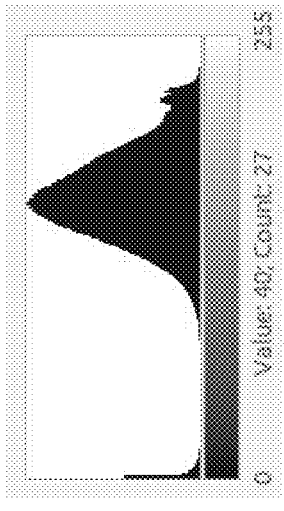 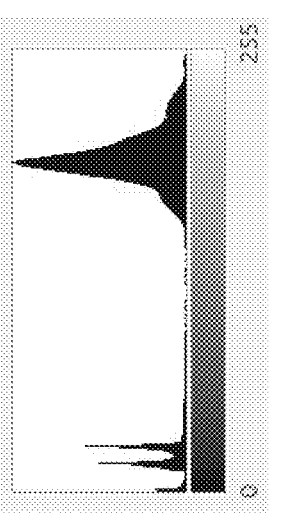 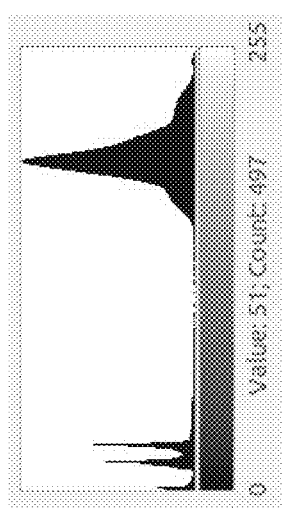
FIG. 1D    FIG. 1E    FIG. 1F

DETECTING SEGMENTS OF A VIDEO PROGRAM THROUGH IMAGE COMPARISONS

CROSS-REFERENCE TO RELATED APPLICATIONS

This application is a continuation of the co-pending U.S. patent application titled, "DETECTING SEGMENTS OF A VIDEO PROGRAM THROUGH IMAGE COMPARISONS," filed on Aug. 4, 2016 and having Ser. No. 15/228,143, which is a continuation of U.S. patent application titled "DETECTING SEGMENTS OF A VIDEO PROGRAM," filed Mar. 17, 2015 and having Ser. No. 14/660,894, issued as U.S. Pat. No. 9,418,296. The subject matter of these related applications is hereby incorporated herein by reference.

FIELD OF THE DISCLOSURE

The present disclosure generally relates to computer-implemented digital image and video processing techniques, and relates more specifically to computer-implemented techniques for improving the accuracy of detecting one or more segments within a first digital video that are similar, but not identical, to one or more segments in a second, related digital video.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A content provider may store episodes of a television or movie series to download. A user, through a client computer, may select an episode of the series to download and watch from the content provider. When a user is finished downloading and watching the first episode on the client computer, the user may select, through the client computer, a second episode in the series to watch, and so on. Watching several episodes of a series in a row is commonly referred to as "binge watching".

To encourage binge watching, after a client computer finishes playing a selected episode of a series, the client computer may automatically request and play the next episode in the series from the content provider. However, each episode in the series may include a video segment for displaying credit images (credits) that identify people involved in making the episode, and the credits may take several minutes to play through; this video segment is referred to herein as a closing credits segment. Users that are binge watching a series may want to skip to the next episode without watching the closing credits segment of each episode in the series.

A user may want to automatically skip other segments in an episode. For example, each episode in the series may include a video segment for introducing the episode, which often lists the names of the featured cast and crew members; this video segment is referred to herein as an opening credits segment or title segment. Users that are binge watching a series may want to skip the opening credits segment of each episode in the series.

Configuring a computer to detect when a video segment, such as an opening credits segment or closing credits segment, begins and ends in an episode may be difficult. For example, the same video segments may be different between episodes, thus checking for identical frames between episodes may be ineffective.

Configuring a computer to detect when a video segment begins and ends may be difficult for other reasons. For example, an opening credits segment or a closing credits segment may be different for each episode in a series. One or more episodes in a series may start playing a hook segment, which varies in length, before the opening credits segment. One or more episodes in a series may include a segment after the closing credits segment with a final gag. One or more episodes may include outtakes that are played during the closing credits segment, in which case, a user may want the client computer to play the closing credits segment.

Accurately determining the beginning and end of a video segment may improve a user's experience and reduce the overall required bandwidth to stream multimedia content to one or more client computers. For example, if the opening and closing credits segments in an episode are correctly determined, then the client computer may skip those segments without requiring user input to skip forward or backward in a video to find the unique content in the episode. Also for example, the client computer need not download the audio or visual segments that are part of one or more common segments in a series, such as the opening or closing credits segments.

SUMMARY

The appended claims may serve as a summary of the invention.

BRIEF DESCRIPTION OF THE DRAWINGS

In the drawings:

FIG. 1A is a first frame of an episode in a series, in an example embodiment.

FIG. 1B is a frame of an episode in a series, in an example embodiment.

FIG. 1C is a frame of an episode in a series in an example embodiment.

FIG. 1D is a histogram illustrating a color distribution of the frame in FIG. 1A in an example embodiment.

FIG. 1E is a histogram illustrating a color distribution of the frame in FIG. 1B in an example embodiment.

FIG. 1F is a histogram illustrating a color distribution of the frame in FIG. 1C in an example embodiment.

Figure 2:
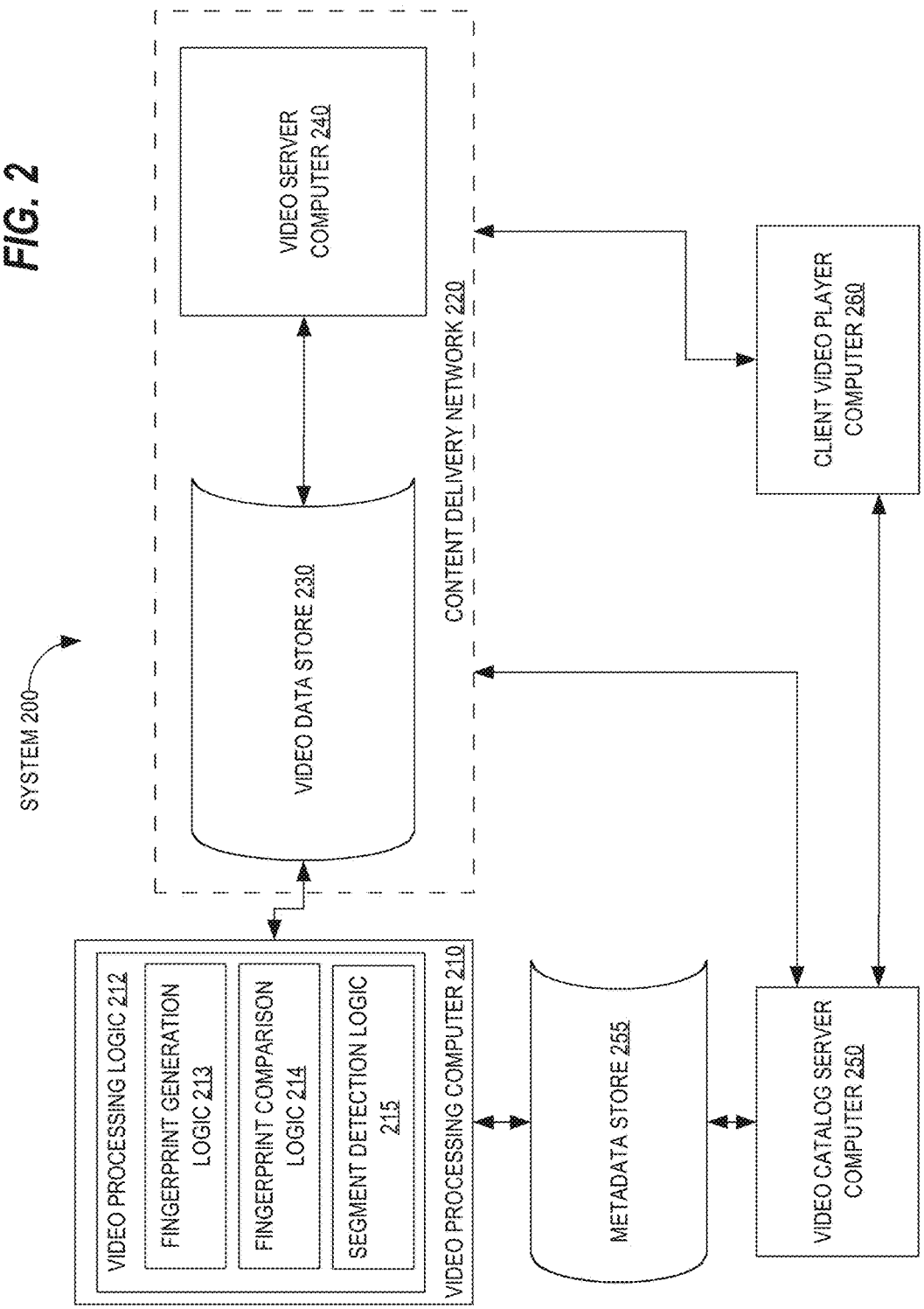
FIG. 2 illustrates a system comprising a video processing computer, video data store, video server computer, video catalog server computer, and client computers distributed across a plurality of interconnected networks, in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Process Overview
3.0 Example Network Topology for Detecting Segments within an Episode of a Series and Distributing the Episode to one or more Client Devices
   3.1 Video Delivery Network
      3.1.1 Video Data Store
         3.1.1.1 Anatomy of an Episode
      3.1.2 Video Server Computer
   3.2 Metadata Store
   3.3 Video Processing Logic
   3.4 Video Catalog Server Computer
   3.5 Client Video Player Computer
4.0 Example Process for Identifying Common Video Segments between Episodes
   4.1 Generating Model Fingerprints
      4.1.1 Generating a Color Distribution
      4.1.2 Generating a Super Color Distribution
      4.1.3 Representations of Colors and Color Distributions
   4.2 Generating Test Fingerprints
   4.3 Determining Whether the Test Fingerprint and the Model Fingerprint Match
      4.3.1 Determining a Closeness Value Based on Color Distributions
      4.3.2 Determining a Closeness Value Based on Face Detection
      4.3.3 Determining a Closeness Value Based on Feature Recognition
      4.3.4 Determining a Closeness Vector or Aggregate Closeness Value Based on Multiple Closeness Values
   4.4 Determining Whether the Model Frame and the Test Frame Match
   4.5 Determining a Segment Boundary
      4.5.1 Finding a Segment Boundary by Forward or Reverse Searching
      4.5.2 Finding a Segment Boundary Based on Time
      4.5.3 Determining a Beginning Boundary Based on more than one Frame in an Episode
      4.5.4 Determining a Ending Boundary Based on more than one Frame in an Episode
      4.5.5 Determining Implied Boundaries
   4.6 Finding Multiple Segments in an Episode
   4.7 Determining and Responding to Optional Segments
   4.8 Storing Metadata
      4.8.1 Metadata for Different Versions of the Same Episode
5.0 Example Process for Distributing Video to Client Computers with one or more Detected Segments
   5.1 Skipping and/or Not Downloading Segments Based on User Input
   5.2 Applying one or more Effects
6.0 Implementation Mechanisms—Hardware Overview
7.0 Other Aspects of Disclosure

1.0 General Overview

In an embodiment, a video processing system comprises: a data store storing a first video and a second video that is associated with the first video; a computer processor coupled to the data store and programmed to: generate a first model fingerprint of the first video, based on pixels in a first model frame in a first model segment of the first video stored in the data store; generate a first test fingerprint of the second video based on pixels in a first test frame in the second video stored in the data store; determine a first closeness value between the first model fingerprint and the first test fingerprint; determine, based on the first closeness value, whether the first test frame is a first boundary of a first segment in the second video, wherein the first segment in the second video is similar to the first model segment in the first video.

In an embodiment, the computer processor is programmed to: generate a second model fingerprint based on pixels in a second model frame in the first model segment of the first video stored in the data store; generate a second test fingerprint based on pixels in a second test frame in the second video stored in the data store; determine a second closeness value between the second model fingerprint and the second test fingerprint; determine, based on the second closeness value, whether the second test frame is a second boundary of the first segment in the second video, wherein the first boundary is a beginning boundary of the first segment in the second video and the second boundary is an ending boundary of the first segment in the second video; send, in response to determining that the first test frame is the first boundary and the second test frame is the second boundary, a first value that indicates the beginning boundary and a second value that indicates the ending boundary to a video player on a client computer, which causes the video player to skip ahead to the ending boundary in the second video when the video player reaches the beginning boundary.

In an embodiment, the computer processor is programmed to: generate the first model fingerprint by determining a first model color distribution based on a first set of model pixels in the first model frame, wherein each particular color in the first model color distribution is associated with a value that indicates how many pixels in the first set of model pixels are assigned the particular color; generate the first test fingerprint by determining a first test color distribution based on a first set of test pixels in the first test frame, wherein each particular color in the first test color distribution is associated with a value that indicates how pixels in the first set of test pixels are assigned the particular color.

In an embodiment, the computer processor is programmed to: determine a set of difference values, wherein each difference value in the set of difference values corresponds with a color and indicates how many pixels are assigned the color in the first model color distribution compared to how many pixels are assigned the color in the first test color distribution; determine a sum by adding each difference value in the set of difference values; determine the first closeness value by dividing the sum by how many pixels are in the first set of model pixels.

In an embodiment, a method for requesting video from a server computer to play on a client computer comprising: receiving input from a user selecting a first video title, wherein the first video title is associated with a second video title, and the first video title includes one or more common video segments with the second video title; requesting, from the server computer, a set of metadata associated with the first video title indicating one or more common segments that may be skipped; receiving the metadata, and in response, requesting one or more video segments in the first video title without requesting the one or more common video segments.

In an embodiment, a digital video distribution system comprising: a memory; one or more processors coupled to the memory; a fingerprint generation logic coupled to the one or more processors and the memory, wherein the fingerprint generation logic configured to: generate a first model fingerprint of a first video, based on pixels in a first model frame in a model segment of the first video; generate a first test fingerprint of a second video based on pixels in a first test frame; a fingerprint comparison logic coupled to the memory and the one or more processors, wherein the fingerprint comparison logic is configured to determine a first closeness value between the first model fingerprint and the first test fingerprint; a segment detection logic coupled to the memory and the one or more processors, wherein the segment detection logic is configured to determine, based on the first closeness value, the first test frame is a first boundary of a segment in the second video.

Embodiments discussed herein provide numerous benefits and improvements over the general idea of skipping over portions of a video. For example, one or more of the embodiments discussed herein may use computer-based image analysis techniques to automatically detect the beginning and ending boundaries of similar and/or common, but not identical, segments between a plurality of episodes in a television or movie series using various digital image and video processing techniques. Furthermore, using the methods discussed herein may improve the machine efficiency of playing digital video on a client video player computer by skipping, and/or not downloading, common portions of video in a series that are not necessary to display, thereby reducing transmission time and bandwidth consumption in the case of streaming video transmission.

2.0 Process Overview

As discussed herein, configuring a computer to detect when a video segment, such as an opening credits segment or closing credits segment, begins and ends in an episode may be difficult. For example, assume FIG. 1A is the first frame from an opening credits segment of a first episode in a particular series, and FIG. 1B is a first frame from an opening credits segment of a second episode in the same particular series. As illustrated in FIG. 1A and FIG. 1B, the first episode is directed by a different person than the second episode. Thus, if the frame that corresponds with FIG. 1A is designated as the first frame of an opening credits segment, then a computer may incorrectly determine that the frame that corresponds to FIG. 1B is not the beginning of an opening credits segment in the second episode by comparing the frame in FIG. 1A with the frame in FIG. 1B.

A video processing computer may detect common segments in a plurality of episodes of a particular series even though the frames in the common segments in each episode, respectively, are not identical. For example, a video processing computer may receive input indicating a particular segment of a first episode in a series is the opening credits segment. The particular segment in the first episode may be referred to as the model segment. The video processing computer may generate and store one or more frame fingerprints that correspond with the one or more frames in the model segment, respectively. A fingerprint or frame fingerprint may be data that represents one or more features in a corresponding frame. A frame fingerprint that corresponds to a frame in a model segment may be referred to as a model fingerprint or a model frame fingerprint. Accordingly, the one or more frame fingerprints of the model segment may be referred to as the one or more model frame fingerprints or one or more model frame fingerprints. For purposes of illustrating a clear example, FIG. 1D is a visualization of a frame fingerprint generated based on the image illustrated in FIG. 1A, which may be a frame in a model opening credits segment in a model episode of a series. FIG. 1D is a histogram illustrating a color distribution of the frame in FIG. 1A in an example embodiment.

The video processing computer may generate one or more test frame fingerprints that correspond to one or more frames in a second episode, or test episode, in the series. A test episode may be an episode in a series that is not a model episode in a series. A test frame may be a frame in a test episode. For purposes of illustrating a clear example, FIG. 1E and FIG. 1F are a visualizations of frame fingerprints generated based on the images illustrated in FIG. 1B and FIG. 1C, which may be test frames from a test episode of a series. FIG. 1E and FIG. 1F are histograms illustrating color distributions of the frames in FIG. 1B and FIG. 1C, respectively, in an example embodiment.

The video processing computer may compare the one or more model frame fingerprints with the one or more test frame fingerprints. In response to determining that the one or more model frame fingerprints are close to, and/or "match", the one or more test frame fingerprints, the video processing computer may determine that the one or more frames in the second episode that correspond with the one or more test frame fingerprints are at least part of the segment in the second episode that is common with the segment in the first episode, which in this example is the opening credits segment.

In response to receiving a request for the second episode from a client computer, a server computer may send data to the client computer indicating that the client computer may skip and/or need not download the one or more frames that are in the common segment, which in this example is the opening credits segment, in the second episode.

3.0 Example Network Topology for Detecting Segments within an Episode of a Series and Distributing the Episode to One or More Client Devices FIG. 2 illustrates a system comprising a video processing computer, video data store, video server computer, video catalog server computer, and client computers distributed across a plurality of interconnected networks, in an example embodiment. In FIG. 2, digital video distribution system 200 includes video processing computer 210, content delivery network 220 that includes video data store 230 and video server computer 240, metadata store 255, video catalog server computer 250, and client video player computer 260, distributed across a plurality of interconnected networks.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

A server computer may be a computer that receives requests for data and responds with data. For example, a web server computer may be an HTTP-based computer that receives HTTP requests and responds with data comprising HTML, CSS, JavaScript, video, and/or audio data. Additionally or alternatively, a server computer may respond with data that references data, such as video or audio data, on other server computers in, and/or outside of, content delivery network 220.

While components may be illustrated as if running on a separate, remote computer from each other, one or more of the components listed above may be part of and/or executed on the same computer. For example, video processing computer 210, metadata store 355, and video catalog server computer 250 may be executed on the same computer, local area network, and/or wide area network.

3.1 Video Delivery Network ("CDN")

CDN 220 may comprise one or more server computers, such as video data store 230 and video server computer 240, which receive requests for video and/or audio data from users through one or more computers, such as client video player computer 260 or video processing computer 410. CDN 220 may respond by sending video and/or audio data to the client computer that sent the request. The one or more computers in CDN 220 may, but need not, be owned and/or managed by one or more independent entities and may span across one or more computer networks and/or geographic regions.

3.1.1 Video Data Store

Video data store 230 may store a plurality of episodes in one or more series. For example, video data store 230 may include a copy of model episode 301 and episode 302, which may comprise video and audio data, and are discussed in further detail herein. Video data store 230 may include one or more versions of one or more episodes. One version may be a lower resolution and/or in a different format to support various client computers and throughput. Video data store 230 may store audio chunks that correspond to each video chunk stored on video data store 230. Additionally or alternatively, a video chunk may include audio data. While video data store 230 is illustrated as a single data storage system in FIG. 2, video data store 230 may comprise one or more storage devices distributed across a plurality of computer networks and/or geographic regions.

3.1.1.1 Anatomy of an Episode

Figure 3:
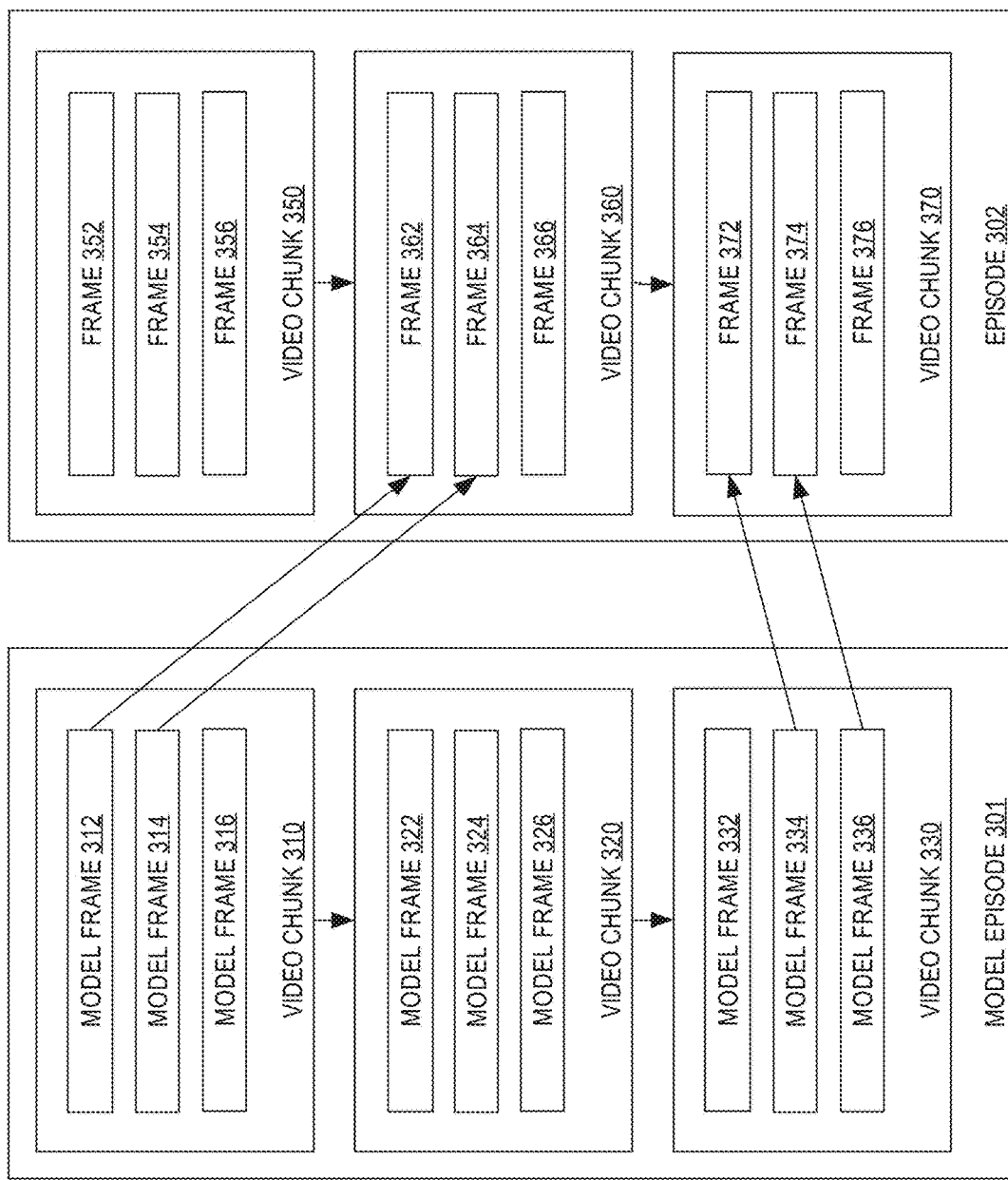
FIG. 3 illustrates a series of frames in a series of video chunks in a first model episode and a series of frames in a series of video chunks in a different episode of the same television or movie series, in an example embodiment.

FIG. 3 illustrates a series of frames in a series of video chunks in a first model episode and a series of frames in a series of video chunks in a different episode of the same television or movie series, in an example embodiment. In FIG. 3, model episode 301 comprises a series of frames: model frame 312 through model frame 336. Episode 302 comprises a series of frames: frame 352 through frame 376. Model episode 301 and episode 302 may include and/or reference audio data. A frame may comprise a collection of pixel data, such as an image, indicating a color for each pixel in the frame.

An episode may comprise one or more video chunks. One or more frames may be referenced by, associated with, and/or included in, a video chunk. For example, model episode 301 comprises video chunk 310, video chunk 320, and video chunk 330. Episode 302 comprises video chunk 340, video chunk 350, and video chunk 360. Video chunk 310 includes model frames 312-316; video chunk 320 includes model frames 322-326; video chunk 330 includes model frames 332-336; video chunk 350 includes model frames 352-356; video chunk 360 includes model frames 362-366; video chunk 370 includes model frames 372-376.

For purposes of illustrating a clear example, each episode in FIG. 3 is depicted to have three video chunks, and each video chunk is depicted to have three frames; however, an episode may comprise any number video chunks, and a video chunk may comprise any number of frames. Furthermore, each episode is depicted with the same number of video chunks; however, each episode in a series need not include the same number of video chunks. Each video chunk is depicted with the same number of frames per video chunk; however, each video chunk need not include the same number of frames. Each video chunk may include and/or reference audio data that corresponds to the frames in the video chunk.

A client video computer may download video chunks in an episode separately and/or asynchronously. For purposes of illustrating a clear example, assume each video chunk in an episode includes two seconds of frames in an episode, and is associated with a particular timestamp or unique index value. As a pre-process to playing an episode, the video player computer may asynchronously request and download the first three two-second video chunks from a video server computer, which are associated with three timestamps: 00:00:00.00, 00:00:02.00, and 00:00:04.00, respectively. The client video player computer may request and/or download each video chunk in an episode in an order that is based on how soon the each video chunk should be displayed. For example, a video player may request video chunk 310 before requesting video chunk 330; however, the video player may receive video chunk 330 before, and/or asynchronously from, video chunk 310.

A client video computer may play the downloaded video chunks serially in an order based on their associated timestamps or index values as if the episode was stored in a single file. Continuing with the previous example, after the client video player downloads the first video chunk, which is associated with the 00:00:00.00 timestamp, the client video player may play the first video chunk. Playing a video chunk or segment may mean causing the frames in the first video chunk or segment to be displayed in rapid succession over a particular period of time, which in the current example is two seconds. After the client video player downloads the second video chunk, which is associated with the 00:00:02.00 timestamp, and after the first video chunk is played, the client video player may play the second video chunk. After the client video player downloads the third video chunk, which is associated with the 00:00:04.00 timestamp, and after the second video chunk is played, the client video player may play the third video chunk, and so on.

3.1.2 Video Server Computer

Returning to FIG. 2, video server computer 240 may receive requests for one or more videos, audio, video chunks, and/or audio chunks from one or more client computers, such as client video player computer 260. Video server computer 240 may retrieve the requested video and/or video chunk from video data store 230 and return the video and/or video chunk to the client video player. While video server computer 240 is illustrated as a single computer in FIG. 2, video server computer 240 may comprise one or more computers distributed across a plurality of computer networks and/or geographic regions. Video server computer 240 and video data store 230 may be different sets of one or more computers, as illustrated in FIG. 2. However, in an embodiment, video server computer 240 may be executed on the same one or more computers as video data store 230.

3.2 Metadata Store

Metadata store 255 may store metadata associated with one or more episodes in one or more series. For example, metadata store 255 may include metadata identifying the frames in model episode 301 that are part of an opening credits segments and/or a closing credits segment. The metadata associated with a model episode, such as model episode 301, may be generated by a user. For example, a user may watch model episode 301 and save metadata in metadata store 255, through a client computer not illustrated in FIG. 2, indicating that one or more frames belong to one or more segments.

Metadata store 255 may also receive and store metadata from video processing logic 212 and/or video processing computer 210. For example, metadata store 255 may receive metadata from video processing logic 212 that identifies one or more frames that belong to an opening credits segment and/or a closing credits segment in episode 302, which correspond to the opening credits segment and closing credits segment in model episode 301. The metadata may include version specific data, such as whether a particular segment was detected in a particular version of episode 302. Metadata store 255 may be persistent storage. While metadata store 255 is illustrated as a single data storage system in FIG. 4, metadata store 255 may comprise one or more storage devices distributed across a plurality of computer networks and/or geographic regions.

3.3 Video Processing Logic

Video processing computer 210 comprises video processing logic 212. Video processing computer 210 and/or video processing logic 212 may process model and/or test episodes stored in video data store 230, retrieve and/or process metadata for model episodes from metadata store 255, detect corresponding segments in one or more episodes, and/or store metadata in metadata store 255 indicating which segments were detected in which episodes and/or which frames are part of each segment detected in each episode, as discussed in detail herein. Accordingly, video processing computer 210 may be coupled to video data store 230 and/or metadata store 255.

Video processing logic 212 may be software and/or hardware coupled to, and/or executed by, video processing computer 210. While video processing logic 212 is illustrated as a software application and/or computing device that is executed by, and/or coupled to, a single computer (video processing computer 210), video processing logic 212 may be executed by, and/or coupled to, a plurality of computers. For example, video processing computer 210 may comprise a plurality of computers distributed across a one or more computer networks and/or geographic regions, and video processing logic 212 may be executed on each of the plurality of computers working in concert to process one or more episodes stored in video data store 230.

Video processing logic 212 may comprise one or more components configured to perform one or more operations discussed herein. For example, in FIG. 2, video processing logic 212 comprises fingerprint generation logic 213, fingerprint comparison logic 214, and segment detection logic 215. Video processing logic 212 and/or each of the components may be operably coupled. Fingerprint generation logic 213, fingerprint comparison logic 214, and/or segment detection logic 215 may be software and/or hardware coupled to, and/or executed by, video processing computer 210. Fingerprint generation logic 213, fingerprint comparison logic 214, and/or segment detection logic 215 are illustrated as if executed on the same computer; however, one or more of the components of video processing logic 212 may be executed and/or distributed across one or more computers. For purposes of illustrating clear examples herein, video processing logic 212, and/or one or more components of video processing logic 212, may perform one or more operations discussed herein; however, each operation may be performed by video processing logic 212 and/or by one or more components of video processing logic 212.

Video processing logic 212, and/or one or more components of video processing logic 212, may comprise specialized circuitry. For example, fingerprint generation logic 213 may generate color distributions, perform text recognition operations, and/or perform facial recognition operations using a specialized digital image and/or signal processor. A digital image and/or signal processor may be hardwired and/or persistently programmed to support a set of instructions to, and/or that are useful to, transform an image, convert pixels in a particular color space in an image to a different color space, generate color distributions of an image, detect features and/or characters in an image, perform facial recognitions operations on an image, compare a plurality of images, and/or compare features of a plurality of images. A digital image processor may perform these operations more quickly and/or more efficiently than a general purpose central processing unit ("CPU"), such as a reduced instruction set computing processor, executing one or more instructions to perform the same operations. Additionally or alternatively, video processing computer 210 may comprise one or more general purpose CPUs and one or more digital image and/or signal processor.

Figure 4:
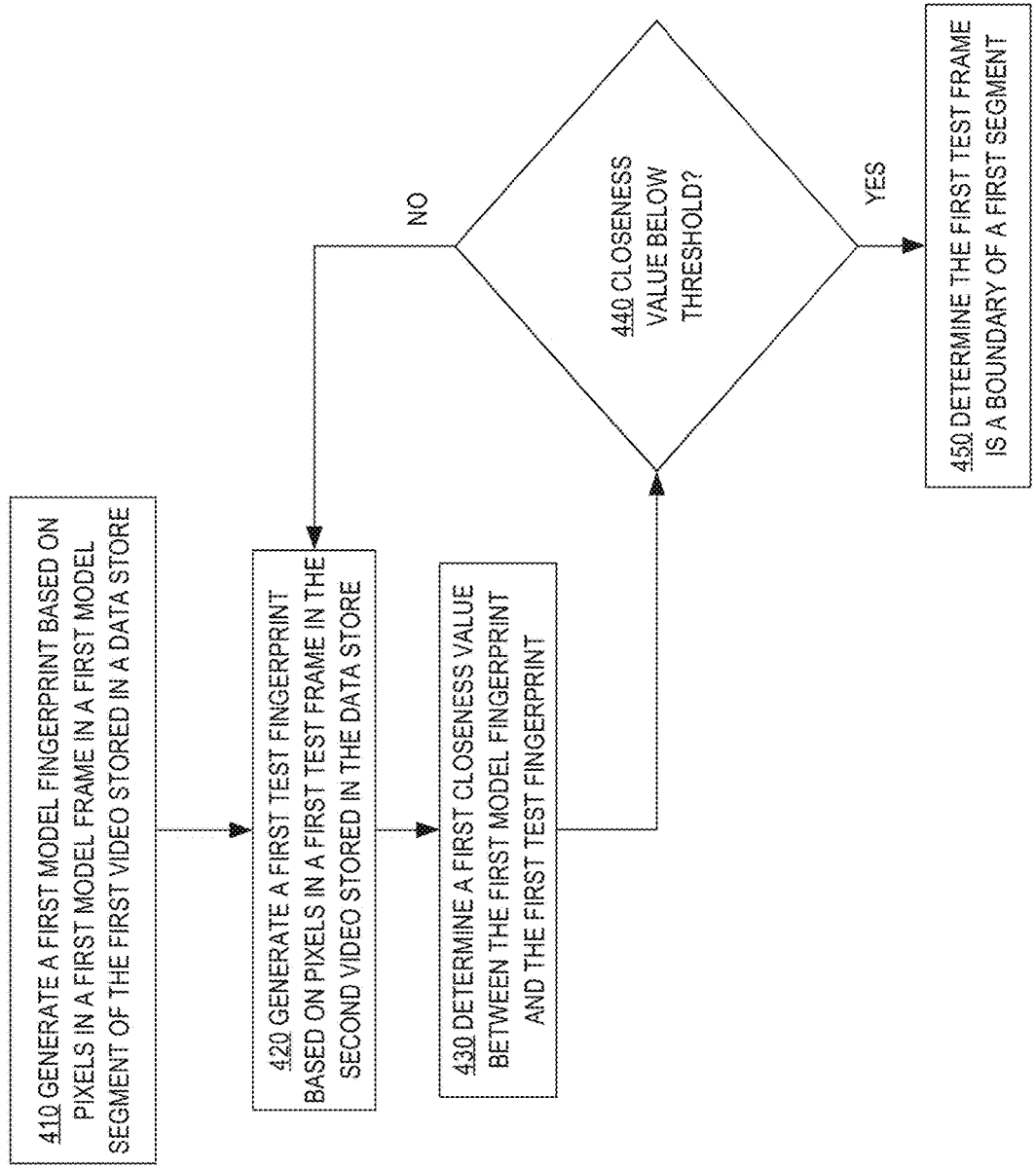
FIG. 4 illustrates a process of detecting a segment in a second video that corresponds with a segment in a first video, in an example embodiment.

In the embodiment illustrated in FIG. 4, video data stored in video data store 230 is processed by video processing computer 210 and/or video processing logic 212. However, video processing computer 210 and/or video processing logic 212 may process episodes stored in one or more other storage systems. For example, an episode may be copied from video data store 230 to video processing computer 210. Video processing logic 212 may process the video data store on video processing computer 210, and store the resulting metadata in metadata store 255.

Figure 6:
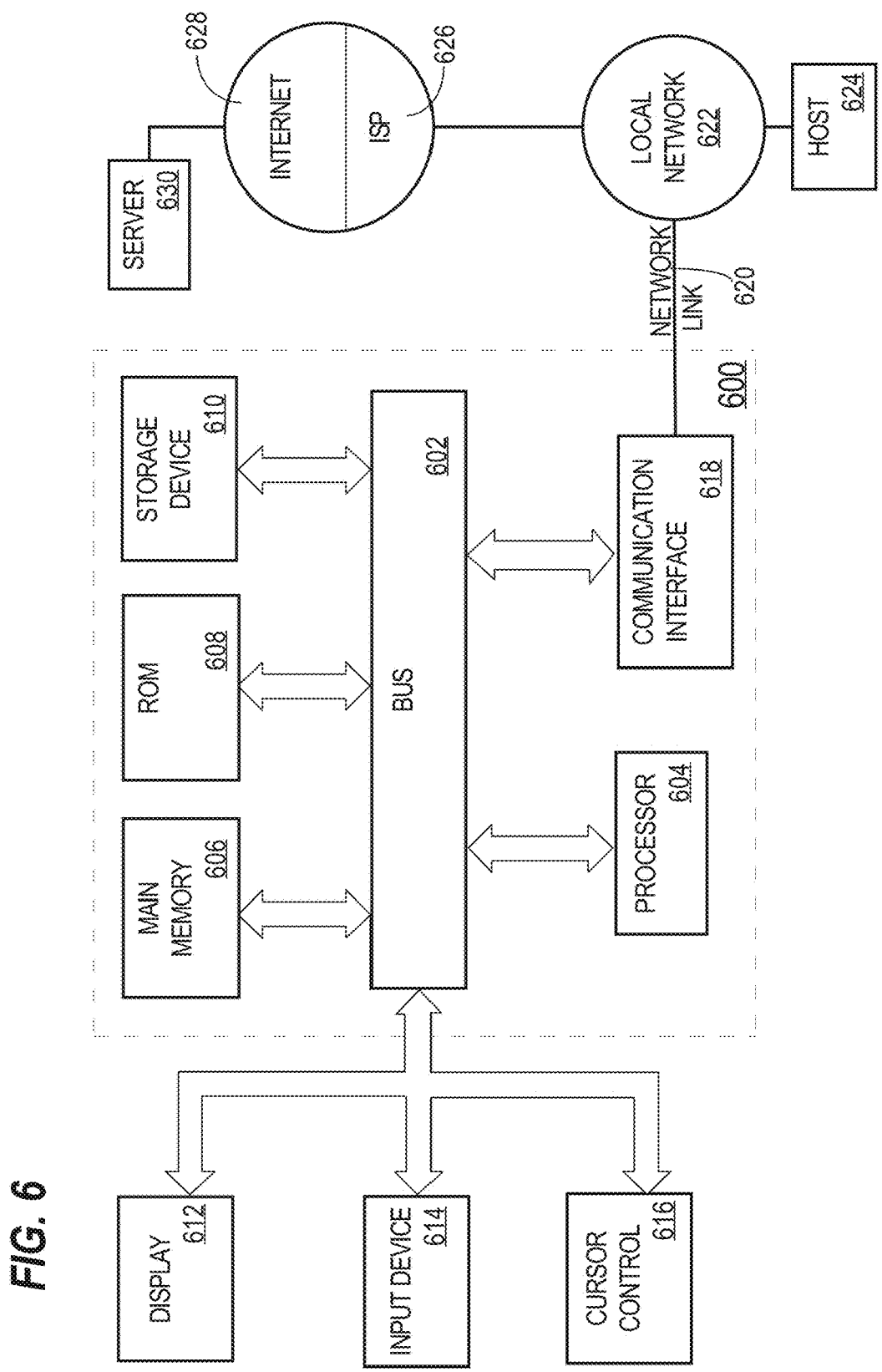
FIG. 6 illustrates a computer system upon which an embodiment may be implemented.

In an embodiment, video processing computer 210 may be implemented using any of the techniques further described herein in connection with FIG. 6; for example, the video processing computer may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other. In an embodiment, the plurality of episodes may be stored in a video data store that is operatively coupled to the video processing computer.

3.4 Video Catalog Server Computer

Video catalog server computer 250 may include data or retrieve data from metadata store 255 indicating in which server(s) a particular episode, and/or portion of an episode, is stored in content delivery network 220. For example, in response to a request for metadata for episode 302 from a client video player computer 260, video catalog server computer 250 may send metadata to client video player computer 260. The metadata may indicate that client video player computer 260 may download episode 302 from video server computer 240 in content delivery network 220. Additionally or alternatively, the metadata may identify one or more segments within episode 302.

3.5 Client Video Player Computer

Client video player computer 260 may be a computer, such as a personal computer, tablet, video game console, and/or any other computer discussed herein that is capable of requesting and/or downloading video received from one or more video server computer, and displaying and/or playing the video to a user. For example, client video player computer 260 may be a tablet with an application, which when executed, allows a user to select an episode of a series to watch. In response to receiving user input selecting a particular episode, such as episode 302, client video player computer 260 may request metadata from video catalog server computer 250. Based on the metadata, client video player computer 260 may download episode 302 by requesting each video chunk in episode 302 that includes at least one frame that does not belong to a segment that should be skipped according to metadata, one or more configuration settings, and/or user input stored on, and/or received by, client video player computer 260.

4.0 Example Process for Identifying Common Video Segments Between Episodes

FIG. 4 illustrates a process of detecting a segment in a second video that corresponds with a segment in a first video, in an example embodiment. For purposes of illustrating a clear example, the steps may be described with references to one or more elements in one or more other figures, but using the particular arrangement illustrated in the one or more other figures is not required in other embodiments.

4.1 Generating Model Fingerprints

In step 410, a video processing computer generates a first model fingerprint based on pixels in a first model frame in a first model segment of the first video stored in a data store. For example, video processing logic 212 may receive metadata from metadata store 255, indicating that an opening credits segment begins at model frame 312 and ends at model frame 336 in model episode 301. Fingerprint generation logic 213 may generate a model frame fingerprint for model frame 312.

As discussed herein, a frame fingerprint may be data that represents one or more features in a corresponding frame. A frame fingerprint may be generated in various ways. For example, fingerprint generation logic 213 may generate a color distribution of the frame. The frame fingerprint may comprise the color distribution. Additionally or alternatively, fingerprint generation logic 213 may execute a facial recognition program and/or module to detect whether there are any faces in a frame. A frame fingerprint may comprise data describing any faces that were detected in the frame. The data may indicate the size, location, and/or color of one or more faces detected in the frame. Additionally or alternatively, fingerprint generation logic 213 may execute a feature and/or character recognition program to detect whether one or more lines, corners, letters, numbers, words, and/or any other features and/or characters are described in a frame. A frame fingerprint may comprise data describing any features and/or characters that were detected in the frame.

A frame fingerprint may describe more than one set of features in a frame. For example, a frame fingerprint may include a color distribution for a frame, data indicating that one or more faces were detected in the frame, and/or one or more text characters were detected in the frame.

4.1.1 Generating a Color Distribution

A color distribution corresponds with a set of colors, and indicates, for each color in the set of colors, how many pixels in a frame are the same as the color and/or near the color. For purposes of illustrating a clear example, assume that an image is a grayscale image; each pixel can be one of 256 shades of gray, where the darkest shade of gray (black) is represented by the number zero and the lightest shade of gray (white) is represented by the number 255. A color distribution for the grayscale image may indicate how many pixels are assigned to each shade of gray: zero, one, two, three, and so on, up to 255.

A color distribution may be generated for color images. A color space is a set of colors defined over a domain. For example, an RGB color space is a set of colors defined by a three-component domain: a red component, a green component, and a blue component. An HSV color space is a set of colors defined by a three-component domain: a hue component, a saturation component, and a value component. A CMYK color space is a set of colors defined by a four-component domain: a cyan component, a magenta component, a yellow component, and a key (black) component.

A color may be defined within a color space. For example, a color space may be denoted as a vector with angle brackets surrounding the color components, such as <A, B, C>, where A is the first component of the color, B is the second component of the color, and C is the third component of the color.

A color distribution for a frame with colored pixels may indicate how many pixels have a particular color in the color space. For example, a color distribution may indicate that there are five pixels in the frame with the color <10, 20, 25> in the RGB color space, seven pixels in the frame with the color <0, 20, 10> in the RGB color space, and 300 pixels in the frame with the color <0, 0, 0> in the RGB color space.

Fingerprint generation logic 213 may convert pixels in a first color space to a second color space, and generate a color distribution based on the second color space. For example, fingerprint generation logic 213 may convert a frame with pixels in RGB space, to HSV space, and generate the color distribution based on the HSV components.

4.1.2 Generating a Super Color Distribution

A super color distribution may be comprised of, and/or reference, one or more color distributions of one or more color components in a frame and therefore, for brevity, a super color distribution may be referred to as a color distribution. For purposes of illustrating a clear example, assume a frame includes pixels in HSV space. Fingerprint generation logic 213 may generate a first color distribution based on the first component, which in this example is the Hue component, regardless of the values in the other components. Accordingly, if a first pixel in HSV space is <10, 0, 0> and a second pixel in HSV is <10, 455, 255>, then both pixels will be counted as the same color in the first color distribution. Fingerprint generation logic 213 may also generate a second color distribution based on the second component, which in this example is the Saturation component, regardless of the values in the other components.

Accordingly, if a third pixel in HSV space is <0, 90, 0> and a fourth pixel in HSV is <10, 90, 255>, then both pixels will be counted as the same color in the second color distribution. Fingerprint generation logic 213 may generate a super color distribution by concatenating the data from the second color distribution to the first color distribution.

4.1.3 Representations of Colors and Color Distributions

In the examples illustrated above, colors and color components are represented as one or more integer values between zero and 255, inclusively. However, colors and/or color components may be represented in other ways. For example, a color and/or color component may be represented as one or more as floating point values from zero to one, inclusively. In an embodiment, a color or color component can be converted from 0.0-1.0, inclusively, to integer values from 0-255, inclusively, or vice versa. Additionally or alternatively, a color or color component may be converted to different range or set of values.

In the examples illustrated above, each color and/or color component in a color distribution was a discrete value between zero and 255, inclusively. However, each color and/or color component in the color distribution may be a range of values. For example, a color in a color distribution may be all colors wherein the value of one component is a range, such as [0.0-0.01), wherein square brackets indicate inclusivity, and the parenthesis indicate exclusivity. Furthermore, one or more components may have a range, such as <[0.0-0.01), [0.5-0.6), [0.2-0.3)>. Each color assigned to a pixel with color components that fall within the ranges, respectively, is counted as the same color.

A color distribution can be visualized as a histogram. For example, FIG. 1D is a histogram illustrating a color distribution of a frame illustrated in FIG. 1A in an example embodiment. In FIG. 1D, the bottom axis indicates a range of discrete colors, from zero to 255, inclusively. For purposes of illustrating a clear example, assume each pixel in FIG. 1A is a color defined in RGB space. Fingerprint generation logic 213 may convert each pixel in FIG. 1A from RGB space to HSV space. Fingerprint generation logic 213 may generate a color distribution (illustrated as a histogram in FIG. 1D) based on the first component (the "Hue component", which in this example ranges from zero to 255, inclusively) by determining how many converted pixels have a Hue value assigned to zero, one, two, three, and so on, up to 255. Accordingly, the height of each vertical line in the histogram in FIG. 1D illustrates how many converted pixels have a particular Hue value. For example, and as indicated in the FIG. 1D, the frame illustrated in FIG. 1A has 497 pixels assigned the Hue value 51. Also for example, in FIG. 1F, which is a histogram based on the a frame illustrated in FIG. 1C has 27 pixels assigned to the Hue value 40.

4.2 Generating Test Fingerprints

Returning now to FIG. 4, in step 420, the video processing computer generates a first test fingerprint based on pixels in a first test frame in the second video stored in the data store. For example, fingerprint generation logic 213 may generate a test frame fingerprint for frame 352 according to one or more of methods discussed herein.

4.3 Determining Whether the Test Fingerprint and the Model Fingerprint Match

In step 430, the video processing computer determines a first closeness value between the first model fingerprint and the first test fingerprint. For example, fingerprint comparison logic 214 may generate a closeness value by comparing the model frame fingerprint generated for model frame 312 and the test frame fingerprint generated for frame 352.

4.3.1 Determining a Closeness Value Based on Color Distributions

A closeness value may be determined based on the type of fingerprints being compared. For purposes of illustrating a clear example, assume the model frame fingerprint and the test frame fingerprint are color distributions of model frame 312 and frame 352, respectively. For each color in the set of colors that model frame fingerprint (color distribution) and/or the test frame fingerprint (color distribution) correspond to, fingerprint comparison logic 214 may calculate a difference between the number of pixels found in the model color distribution fingerprint for that color and the number of pixels found in the test color distribution fingerprint for that same color. Fingerprint comparison logic 214 may calculate the absolute value for each of the differences, and add each of the absolute values together to generate a delta value. Fingerprint comparison logic 214 may calculate the closeness value by dividing the delta value by the number of pixels in model frame 312 used to generate the model frame fingerprint and/or the number of pixels in frame 352 to generate the test color distribution fingerprint. In an embodiment, the number of pixels in model frame 312 used to generate the model frame fingerprint is the total number of pixels in model frame 312, and/or the number of pixel in frame 352 to generate the test color distribution fingerprint is the total number of pixels in frame 352.

The following equation illustrates the formula discussed above:

$$closeness = \frac{\sum(|pixels_{m,c} - pixels_{t,c}|)}{total\_pixels}.$$

In the equation above, $pixels_{m,c}$ is the number of pixels for a particular color, c, in the model frame and/or model color distribution, m; pixels is the number of pixels for a particular color, c, in the test frame and/or test color distribution, t. The numerator, which is also referred to herein as the delta value, is the sum of the absolute differences between the $pixels_{m,c}$ and pixels for each color in the model frame color distribution and the test frame color distribution. The value total_pixels is the total number of pixels represented in the model frame color distribution and/or test frame color distribution. The closeness value, closeness, is the ratio of the delta value to the total number of pixels, total_pixels.

For purposes of illustrating a clear example, assume the frame in FIG. 1A is an illustration of model frame 312, the frame in FIG. 1B is an illustration of frame 362, and the frame in FIG. 1C is an illustration of frame 352. Accordingly, the histogram illustrated in FIG. 1D is a visualization of a color distribution of model frame 312, the histogram illustrated in FIG. 1E is a visualization of a color distribution of frame 362, and the histogram illustrated in FIG. 1F is a visualization of a color distribution of frame 352. The histogram in FIG. 1D is similar to the histogram in FIG. 1E; accordingly, fingerprint comparison logic 214 may calculate a first closeness value between model frame 312 and frame 362 that is near zero and/or equal to or below a particular threshold, and in response, determine that model frame 312 and frame 362 match. In contrast, the histogram in FIG. 1D is not as similar to the histogram in FIG. 1F as the histogram in FIG. 1E; accordingly, fingerprint comparison logic 214 may calculate a second closeness value between model frame 312 and frame 352 that is greater than the first closeness value, not near zero, and/or equal to or above a particular threshold, and in response, determine that model frame 312 and frame 352 do not match.

4.3.2 Determining a Closeness Value Based on Face Detection

If the model frame fingerprint and the test frame fingerprint include data describing one or more faces found, if any, in the model frame and test frame, respectively, then the closeness value may be based on the one or more faces, if any, detected in the model frame and/or the test frame. For example, based on the model frame fingerprint and the test frame fingerprint, fingerprint comparison logic 214 may determine a numerator indicating the number of faces that have the same location and/or size in both the model frame and the test frame. Also based on the model frame fingerprint and the test frame fingerprint, fingerprint comparison logic 214 may determine a denominator indicating the total number of faces detected in the model frame and/or the test frame. Fingerprint comparison logic 214 may determine a closeness value by dividing the numerator by the denominator.

4.3.3 Determining a Closeness Value Based on Feature Recognition

If the model frame fingerprint and the test frame fingerprint describe other features found in the model frame and test frame, respectively, then the closeness value may be based on the features detected in the model frame and/or the test frame. For purposes of illustrating a clear example, assume the model frame fingerprint identifies the characters, if any, detected in the model frame and the test frame fingerprint identifies the characters, if any, detected in the test frame fingerprint. Fingerprint comparison logic 214 may compare the characters identified in both the model frame fingerprint and the test frame fingerprint. Fingerprint comparison logic 214 may determine a numerator by counting the number of characters found in both the model frame fingerprint and the test frame fingerprint. Fingerprint comparison logic 214 may compute a denominator indicating the total number of characters in the model frame fingerprint and/or the test frame fingerprint. Fingerprint comparison logic 214 may determine a closeness value by dividing the numerator by the denominator. While this example discusses character recognition, video processing logic 212 may use other feature recognition models as well, such as line, corner, and/or image recognition.

4.3.4 Determining a Closeness Vector or Aggregate Closeness Value Based on Multiple Closeness Values If the model frame fingerprint and/or the test frame fingerprint are comprised of more than one type of fingerprint, then the closeness value may be a vector of closeness values and/or an aggregate closeness value. For purposes of illustrating a clear example, assume that the model frame fingerprint includes a color distribution and data indicating whether any faces are in a corresponding model frame, and the test frame fingerprint includes a color distribution and data indicating whether any faces are in a corresponding test frame. Fingerprint comparison logic 214 may compute a first closeness value based on the color distributions in the model frame fingerprint and the test frame fingerprint, as discussed above. Fingerprint comparison logic 214 may compute a second closeness value indicating how many faces were present in the test frame that were not in the model frame, or vice versa. Fingerprint comparison logic 214 may aggregate the two closeness value into an aggregate closeness value, such as a sum of the first closeness value and the second closeness value. Additionally or alternatively, Fingerprint comparison logic 214 may group the first closeness value and the second closeness value into a closeness value vector, wherein each closeness value corresponds to a type of frame fingerprint associated with the model frame and/or the test frame.

4.4 Determining Whether the Model Frame and the Test Frame Match

Returning to FIG. 4, in step 440, the video processing computer determines whether the closeness value is equal to or below a particular threshold. If the closeness value is equal to and/or below the threshold, then control passes to step 450; otherwise, control passes to step 420. For example, if the closeness value determined from a model color distribution and a test color distribution is below 0.0001, then fingerprint comparison logic 214 may determine that the model frame and the test frame match and proceed to step 450. Otherwise, fingerprint comparison logic 214 may get the next test frame in the episode, which in this example is frame 354 and return to step 420.

If the closeness value is a vector of one or more other closeness values, then each closeness value may be compared to a threshold vector. If one or more values in the vector of closeness values is less than or equal to one or more values in the threshold vector, respectively, then fingerprint comparison logic 214 may determine that the model frame and the test frame match.

For purposes of illustrating a clear example, assume a closeness vector includes three closeness values: the first closeness value corresponds to color distributions stored in the model frame fingerprint and test frame fingerprint; the second closeness value corresponds to the total number of faces detected in the model frame that did not correspond to a face detected in the test frame; the third closeness value is set to one if text is found in both the model frame and the test frame, and zero otherwise. Also assume the threshold vector is 0.0025, zero, and zero. If the first closeness value is less than 0.0025, and/or if the second minor closeness value is equal to zero, and/or if the third minor closeness value is zero, then fingerprint comparison logic 214 may determine that that the model frame and the test frame match; otherwise, fingerprint comparison logic 214 may determine that the model frame and the test frame do not match.

For convenience of expression, two frames "match" if fingerprint comparison logic 214 determines, using one or more methods discussed herein, if the corresponding frame fingerprints are close. Two frame fingerprints may be close if one or more closeness values based on the two frame fingerprints are equal to or below a particular threshold. Additionally or alternatively, two frame fingerprints may be close if one or more closeness values are greater than or equal to a particular threshold. For example, fingerprint comparison logic 214 may calculate the number of characters that are in both a model frame and a test frame, based on values in the corresponding a model frame fingerprint and test frame fingerprint. If the number of characters is equal to or above a particular threshold, such as five, then fingerprint comparison logic 214 may determine that the model frame fingerprint and the test frame fingerprint are close; accordingly, fingerprint comparison logic 214 may determine that the model frame matches the test frame.

4.5 Determining a Segment Boundary

Returning to FIG. 4, in step 450, the video processing computer determines the first test frame is a boundary of a first segment. For example, after generating a test frame fingerprint for frame 352, frame 354, frame 356, and frame 362, and iterating over step 420 through step 440 for each test frame, fingerprint comparison logic 214 may determine that frame 362 matches model frame 312. In response to determining that model frame 312 and frame 362 match, segment detection logic 215 may determine that frame 362 is the boundary of a segment. If the model metadata indicates that model frame 312 is the beginning boundary of the segment, then segment detection logic 215 may determine that frame 362 is the beginning boundary of the same segment in episode 302. If the model metadata indicates that model frame 312 is the ending boundary of the segment, then segment detection logic 215 may determine that frame 362 is the ending boundary of the same segment in episode 302.

4.5.1 Finding a Segment Boundary by Forward or Reverse Searching

In an embodiment, after finding the beginning boundary of a segment, the video processing computer may repeat the steps in FIG. 2 to find the ending boundary of the same segment. For purposes of illustrating a clear example, assume that the model metadata indicates the ending boundary for the current segment is model frame 336. Segment detection logic 215, via fingerprint generation logic 213 and/or fingerprint comparison logic 214, may iteratively test each test frame after the test frame determined to be the beginning boundary of the segment (frame 362 in episode 302) until segment detection logic 215 finds a test frame that matches model frame 336, which in this example is frame 374.

Additionally or alternatively, after finding the ending boundary of a segment, the video processing computer may repeat steps in FIG. 2 to find a beginning boundary of the same segment. For purposes of illustrating a clear example, assume that the model metadata indicates the ending boundary for the current segment is model frame 336 and fingerprint comparison logic 214 determines that frame 374 matches model frame 336. Segment detection logic 215, via fingerprint generation logic 213 and/or fingerprint comparison logic 214, may iteratively test each test frame before the test frame determined to be the ending boundary of the segment (frame 374 in episode 302) until segment detection logic 215 finds a test frame that matches model frame 312, which in this example is frame 362.

4.5.2 Finding a Segment Boundary Based on Time

In an embodiment, a segment may be the same amount of time for each episode in the series. For example, if the beginning of a segment is determined to be a test frame in a test episode that corresponds to a first timestamp, such as 00:00:40.00, and the metadata associated with the model episode indicates that the segment is 10 seconds long, then segment detection logic 215 may determine that the frame corresponding to the timestamp, 00:00:50.00, is the last frame, or ending boundary, of the segment. Similarly, if the ending of a segment is determined to be a particular test frame in a test episode that corresponds to a particular timestamp, such as 01:20:30.00, and the metadata associated with the model episode indicates that the segment is 10 seconds long, then segment detection logic 215 may determine that the frame corresponding to the timestamp, 01:20:20.00, is the first frame, or beginning boundary, of the segment.

A segment in a model episode need not be the same length of time as the segment found in the test episode. A segment in a model episode need not include same number of frames as the segment found in the test episode. For example, a segment defined in model episode 301 may include more frames than the corresponding segment found in episode 302; and, the segment in model episode 301 may be played over a longer period of time than the segment in episode 302.

4.5.3 Determining a Beginning Boundary Based on More than One Frame in an Episode A video processing computer may determine a segment boundary by comparing more than one model frame to more than one test frame, respectively. The more than one model frames and the more than one test frames may be sequential frames. For purposes of illustrating a clear example, assume model frame 312 is the beginning boundary of a segment. In response to determining model frame 312 matches frame 356, segment detection logic 215, via fingerprint generation logic 213 and/or fingerprint comparison logic 214, may determine whether model frame 314 matches frame 362. In response to determining that model frame 314 does not match frame 362, segment detection logic 215 may determine that frame 356 is not the beginning boundary of the segment in episode 302.

In response to determining that a first test frame is not the beginning boundary of a segment in a test episode because a subsequent frame does not match a second model frame in a model episode, the video processing computer may return to a second test frame, which is after the first test frame, to find a match between the second test frame and the model frame at the beginning boundary of the segment in the model episode. Continuing with the previous example, in response to determining that model frame 314 does not match frame 362 and/or that frame 356 is not the beginning boundary of the segment in episode 302, segment detection logic 215 may determine whether model frame 312 matches frame 362.

If the video processing computer determines that the first model frame and the second test frame are a match, then the video processing computer may determine whether the second model frame matches the third test frame. After determining that one or more subsequent model frames match one or more subsequent test frames, respectively, the video processing computer may determine that the last test frame that matches the first model frame, which in this example is frame 362, is the first frame, or beginning boundary, of the segment in episode 302. For example, in response to determining that the model frame 312 matches frame 362, and one or more subsequent and/or sequential model frames match one or more subsequent and/or sequential test frames, such as model frame 316 and frame 364, segment detection logic 215 may determine that frame 362 is the beginning boundary of the segment in episode 302.

For purposes of illustrating clear examples, one additional frame in the model episode and the test episode was used to confirm a beginning boundary. However, five, ten, or any other number of frames in the model episode and/or test episode may be used to confirm the beginning boundary.

4.5.4 Determining a Ending Boundary Based on More than One Frame in an Episode

An ending boundary may be found in a similar fashion, however, instead of comparing one or more subsequent frames, the video processing computer may compare one or more proceeding model frames and test frames, respectively, to find the ending boundary of a segment. For purposes of illustrating a clear example, assume model frame 336 is the ending boundary of a segment. In response to determining model frame 336 matches frame 376, segment detection logic 215, via fingerprint generation logic 213 and/or fingerprint comparison logic 214, may determine whether model frame 334 matches frame 374. In response to determining that model frame 334 does not match frame 374, segment detection logic 215 may determine that frame 376 is not the ending boundary of the segment in episode 302.

In response to determining that a first test frame is not the ending boundary of a segment in a test episode because a preceding frame does not match a second model frame in a model episode, the video processing computer may return to a second test frame, which is before the first test frame, to find a match between the second test frame and the model frame at the ending boundary of the segment in the model episode. Continuing with the previous example, in response to determining that model frame 334 does not match frame 374 and/or that frame 374 is not the ending boundary of the segment in episode 302, segment detection logic 215, via fingerprint generation logic 213 and/or fingerprint comparison logic 214, may determine whether model frame 336 matches frame 374.

If the video processing computer determines that the first model frame and the second test frame are a match, then the video processing computer may determine whether the second model frame matches the third test frame. After determining that one or more preceding model frames match one or more preceding test frames, respectively, the video processing computer may determine that the last test frame that matches the ending boundary model frame, which in this example is model frame 336, is the last frame, or ending boundary, of the segment in episode 302. For example, in response to determining that the model frame 336 matches frame 374, and one or more preceding and/or sequential model frames match one or more preceding and/or sequential test frames, such as model frame 334 and frame 372, segment detection logic 215 may determine that frame 372 is the ending boundary of the segment in episode 302.

For purposes of illustrating clear examples, one additional frame in the model episode and the test episode were used to confirm an ending boundary. However, five, ten, or any other number of frames in the model episode and/or test episode may be used to confirm the ending boundary.

4.5.5 Determining Implied Boundaries

A segment may have an implied boundary. For example, metadata associated with the model episode may indicate that the beginning of the model episode is the beginning boundary of the opening credits segment, regardless of the fingerprint of the first model frame. Accordingly, a video processing computer need not sequentially search for the beginning boundary of the beginning segment, but may still search a test episode for the ending boundary of the opening credits segment to find the opening credits segment in the test episode accordingly to one or more of the methods discussed herein.

In an embodiment, one or more episodes in a series may include a summary segment, which summarizes previous episodes, followed by an opening credits segment, followed by new content. A user binge watching episodes of a series may want client video player computer 260 to automatically skip both the summary segment and the opening credits segment. However, the summary segment may be different for each episode in the series. If metadata associated with the series and/or the model episode indicates that the beginning of each episode is the beginning of the opening credits segment, then segment detection logic 215 may include the summary segment with the opening credits segment for each episode in the series. Accordingly, if client video player computer 260 is configured to skip the opening credits segment, then client video player computer 260 may skip both the summary segment and the opening credits segment of each episode in the series.

Additionally or alternatively, metadata associated with the model episode may indicate that the ending of the model episode is the closing boundary of the closing credits segment, regardless of the fingerprint of the last model frame. Accordingly, segment detection logic 215 may search a test episode in the series for the beginning boundary of the closing credits segment to find the closing credits segment in the test episode. However, segment detection logic 215 need not sequentially search the test episode for the ending boundary of the closing credits segment; segment detection logic 215 may assume the ending boundary is the last frame in the test episode.

4.6 Finding Multiple Segments in an Episode

A model episode may include multiple segments. For example, metadata associated with model episode 301 may indicate that model episode 301 has an opening credits segment and closing credits segment. Accordingly, video processing logic 212 may use one or more of the methods discussed herein to find the beginning boundary and ending boundary of the opening credits segment in episode 302 and the beginning boundary and ending boundary of the closing credits segment in episode 302.

Different criteria may be used to determine boundaries of a first segment than a second segment. For example, video processing logic 212 may determine the boundaries of an opening credits segment may be based frame fingerprints with color distributions. However, video processing logic 212 may determine boundaries of an ending credits segment based on frame fingerprints with color distributions, face detection, and text detection.

4.7 Determining and Responding to Optional Segments

Metadata associated with a model episode may indicate that a segment is optional. An optional segment may be a segment that each episode in the series may, but need not, include. For example, a model episode in a series may have a closing credits segment. However, one or more episodes in a series may include a closing credits segment that includes new content, such as a gag reel, that a user may want to watch and the client video player computer should not skip by default. Video processing logic 212 may determine the boundaries of a closing credits segment in a particular episode in the series based on color distributions in the model frame fingerprints and the test frame fingerprints; however, in response to determining that the closing credits segment is optional, the video processing computer may determine whether any faces were detected in one or more of the frames in the closing credits segment using one or more of the methods discussed herein. If video processing logic 212 detects one or more faces, then video processing logic 212 may determine, and store metadata associated with the test episode indicating, that the test episode does not include a closing credits segment and/or a client video player should not skip the closing credits segment for the test episode. In an embodiment, video processing logic 212 may withhold, and/or not include, metadata indicating that the test episode does not include a closing credits segment. Accordingly, client video player computer 260 may download and/or play the closing video segment in the test episode.

Additionally or alternatively, if metadata associated with a model episode indicates a particular segment, such as a closing credits segment, is optional, then the a video processing computer may store metadata associated with a test episode in the series indicating that the corresponding segment is optional. Accordingly, a client video player computer, such as client video player computer 260, may be configured to begin playing the optional closing credits segment; however, if the user does not select a particular button within a particular amount of time, then client video player computer 260 may skip the rest of the optional closing credits segment and/or begin playing the next episode in the series. In an embodiment, client video player computer 260 may be configured to play the closing credits segment and also present a button to the user, which if selected, causes client video player computer 260 to skip the closing credits segment and/or begin playing the next episode in the series; otherwise, client video player computer 260 may play the optional closing credits segment.

4.8 Storing Metadata

A video processing computer may generate metadata associated with each test episode to identify one or more segments found in a test episode, the boundaries of each segment, and/or one or more other properties determined by the video processing computer as discussed herein. For example, in response to determining the boundaries for a beginning credits segment in a test episode, such as episode 302, video processing logic 212 may generate and store metadata associated with episode 302 that indicates which frames in episode 302 comprise the opening credits segment.

4.8.1 Metadata for Different Versions of the Same Episode

A video processing computer may search for one or more segments in a test episode based on a model episode, wherein frames in both episodes have the same properties, such as resolution, width, and/or height. If multiple versions of the same test episode are stored in a video data store, then the video processing server computer need not search each version of the test episode for the one or more segments because corresponding frames in different versions of the same episode may have the same timestamp and/or other index value. The video processing system may associate the metadata generated for a particular version of an episode to one or more versions of the same episode.

For example, based on a first version of a particular episode in a series, video processing logic 212 may store a particular set of metadata in metadata store 255 that identifies the particular episode. The particular set of metadata may indicate that the particular episode has an opening credits segment with frames corresponding from a first timestamp to a second timestamp, inclusively or exclusively. If client video player computer 260 downloads and/or plays a second, different version of the particular episode, then client video player computer 260 may request the particular set of metadata from metadata store 255. Accordingly, client video player computer 260 may skip, and/or not download, frames in the second, different version of the particular episode that correspond to a timestamp equal to and/or between the first timestamp and the second timestamp, based on the particular set of metadata.

Figure 5:
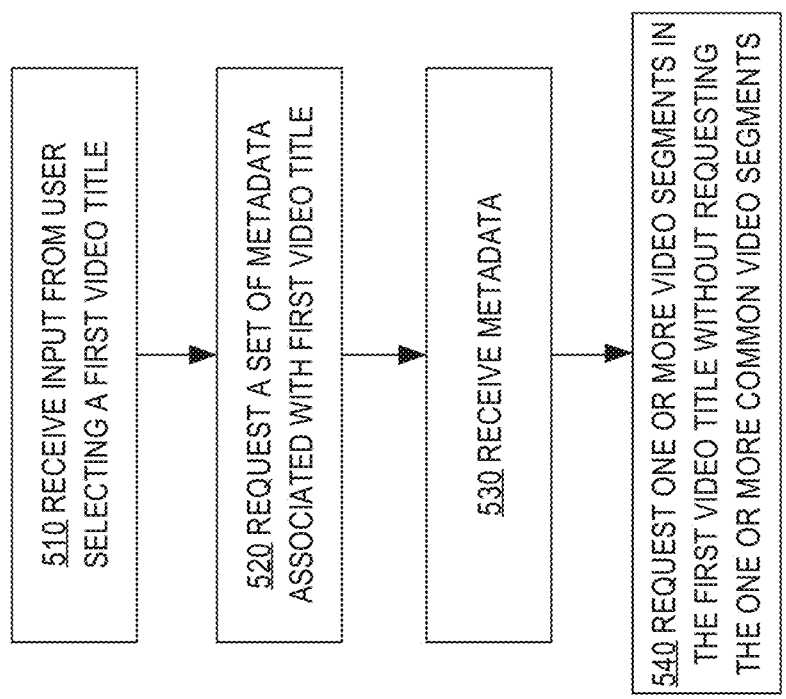
FIG. 5 illustrates a process for replaying video on a client computer without requesting and/or playing one or more common video or audio segments, in an example embodiment.

5.0 Example Process for Distributing Video to Client Computers with One or More Detected Segments FIG. 5 illustrates a process for replaying video on a client computer without requesting and/or playing one or more common video or audio segments, in an example embodiment. In step 510, a client computer may receive input from a user selecting a first video title. For example, client video player computer 260 may receive input from a user selecting episode 302.

In step 520, the client computer requests a set of metadata associated with the first video title. For example, client video player computer 260 may request metadata associated with episode 302 from video catalog server computer 250. The metadata may identify one or more server computer(s) that client video player computer 260 may download episode 302 from, and/or one or more segments in episode 302.

In step 530, the client computer receives metadata. For example, client video player computer 260 may receive metadata stored in metadata store 255 though video catalog server computer 250. The metadata may indicate that client video player computer 260 may download episode 302 from video server computer 240 and/or content delivery network 220. The metadata may identify a closing credits segment starting at timestamp 01:50:00.00 and ending at timestamp 01:59:32.00, inclusively. For purposes of illustrating a clear example, assume that timestamp 01:50:00.00 and 01:59:32.00 correspond with frame 362 and frame 374, respectively.

In step 540, the client computer requests video data in the first video title without requesting the one or more particular video segments. For example, client video player computer 260 may request and download one or more chunks of episode 302 from video server computer 240 that are associated with timestamps, and/or include frames that are associated with timestamps, that are outside of timestamps defining the closing credits segment.

Client video player computer 260 may determine that it need not download video chunks of episode 302 that only include frames that fall within the closing credits segment. For purposes of illustrating a clear example, assume client video player computer 260 is determining whether to download another video chunk of episode 302: video chunk 360. In response to determining that the first frame and the last frame in video chunk 360 correspond with timestamps that fall within the timestamps associated with the closing credits segment, inclusively, client video player computer 260 may not request and/or download video chunk 360 from video server computer 240.

If a client computer determines that one or more frames in a video chunk fall outside a particular segment, then the client computer may download the video chunk, and/or play the frames in the video chunk, that fall outside of the segment. For example, client video player computer 260 may determine that video chunk 370 has a first frame (frame 372) that corresponds to 01:59:32.00, which is inside the closing credits segment; however, since the length of video chunk 370 is three seconds, then client video player computer 260 may determine that video chunk 370 includes one or more frames that fall outside of the closing credits segment. Accordingly, client video player computer 260 may download video chunk 370 and play the frames in video chunk 370 that correspond with timestamps after the closing credits segment boundary (01:59:32.00), which in this example includes frame 376.

5.1 Skipping and/or not Downloading Segments Based on User Input

A client computer may receive input from a user indicating the player should automatically skip particular segments, such as an opening credits segment and/or a closing credits segment. In response, the client computer need not download and/or play frames that correspond to the one or more segments of an episode that the user has indicated should be skipped.

5.2 Applying One or More Effects

A client computer may apply one or more visual effects and/or audio effects at the boundaries of a segment. For example, a client computer may fade to black, and/or fade to mute, over one or more frames as the client computer plays frames at or near the beginning boundary of a video segment before the client computer skips a particular segment. Additionally or alternatively, the client computer may fade from black, and/or fade from mute, over one or more frames as the client computer plays frames at or near the ending boundary of a segment. In an embodiment, a client computer may play one or more frames in a segment that should be skipped while performing an effect.

A client computer need not download and/or process other data associated with a segment that should be skipped. For example, client video player computer 260 may request, download, and/or play audio data associated with video chunk 350. However, client video player computer 260 need not request, download, and/or play audio data associated with video chunk 360. Client video player computer 260 may request, download, and/or player audio data associated with video chunk 370, or at least the one or more frames in video chunk 370 that fall outside the closing credits segment.

6.0 Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to an embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface

618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Other Aspects of Disclosure

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of the subject matter described herein are set out in the following numbered clauses:

1. A video processing system comprising: a data store storing a first video and a second video that is associated with the first video; a computer processor coupled to the data store and programmed to: generate a first model fingerprint of the first video, based on pixels in a first model frame in a first model segment of the first video stored in the data store; generate a first test fingerprint of the second video based on pixels in a first test frame in the second video stored in the data store; determine a first closeness value between the first model fingerprint and the first test fingerprint; determine, based on the first closeness value, whether the first test frame is a first boundary of a first segment in the second video, wherein the first segment in the second video is similar to the first model segment in the first video.

2. The video processing system of clause 1, wherein the computer processor is programmed, in response to determining that the first test frame is a first boundary, to determine whether the first boundary is an ending boundary of the first segment in the second video, and if so, send a value that indicates the ending boundary to a video player on a client computer that is configured to play the second video, which value causes the video player to skip ahead to the ending boundary.

3. The video processing system of clause 1-2, wherein the computer processor is programmed, in response to determining that the first test frame is a first boundary, to determine whether the first boundary is a beginning boundary of the first segment in the second video, and if so, send a value that indicates the beginning boundary to a video player on a client computer that is configured to play the second video, which value causes the video player to stop playing the second video and request a third video that is associated with the first video and begin playing the third video for a user.

4. The video processing system of clause 1-3, wherein the computer processor is programmed to: generate a second model fingerprint based on pixels in a second model frame in the first model segment of the first video stored in the data store; generate a second test fingerprint based on pixels in a second test frame in the second video stored in the data store; determine a second closeness value between the second model fingerprint and the second test fingerprint; determine, based on the second closeness value, whether the second test frame is a second boundary of the first segment in the second video, wherein the first boundary is a beginning boundary of the first segment in the second video and the second boundary is an ending boundary of the first segment in the second video; send, in response to determining that the first test frame is the first boundary and the second test frame is the second boundary, a first value that indicates the beginning boundary and a second value that indicates the ending boundary to a video player on a client computer, which causes the video player to skip ahead to the ending boundary in the second video when the video player reaches the beginning boundary.

5. The video processing system of clause 1-4, wherein the computer processor is programmed to: generate the first model fingerprint by determining a first model color distribution based on a first set of model pixels in the first model frame, wherein each particular color in the first model color distribution is associated with a value that indicates how many pixels in the first set of model pixels are assigned the particular color; generate the first test fingerprint by determining a first test color distribution based on a first set of test pixels in the first test frame, wherein each particular color in the first test color distribution is associated with a value that indicates how pixels in the first set of test pixels are assigned the particular color.

6. The video processing system of clause 1-5, wherein the computer processor is programmed to: determine a set of difference values, wherein each difference value in the set of difference values corresponds with a color and indicates how many pixels are assigned the color in the first model color distribution compared to how many pixels are assigned the color in the first test color distribution; determine a sum by adding each difference value in the set of difference values;

determine the first closeness value by dividing the sum by how many pixels are in the first set of model pixels.

7. The video processing system of clause 1-6, wherein the computer processor is programmed to store the first model color distribution in the data store as the first model fingerprint.

8. The video processing system of clause 1-7, wherein the computer processor is programmed to: convert one or more first color components of each pixel in a first color space from the first set of model pixels and the first set of test pixels into one or more second color components defined in a second color space, wherein the first color space and the second color space are different; determine the first model color distribution based on the one or more second color components of each pixel in the first set of model pixels; determine the first test color distribution based on the one or more second color components of each pixel in the first set of test pixels.

9. The video processing system of clause 1-8, wherein the computer processor is programmed to: generate a second model fingerprint based on pixels in a second model frame in the first model segment of the first video stored in the data store, wherein the second model frame is different than the first model frame; generate a second test fingerprint based on pixels in a second test frame in the second video; determine a second closeness value between the second model fingerprint and the second test fingerprint; determine, based on the second closeness value, whether the first test frame is a first boundary of a first segment in the second video, wherein the first segment in the second video is similar to the first model segment in the first video.

10. The video processing system of clause 1-9, wherein the computer processor is programmed to determine that the first frame is the first boundary of the first segment in the second video if the first closeness value and the second closeness value are both below a particular threshold.

11. The video processing system of clause 1-10, wherein the computer processor is programmed to: detect whether a face is in the first test frame; in response to determining that the face is detected in first frame, withholding data from a video player on a client computer, wherein the data indicates that the video player may skip the first segment starting at the first test frame.

12. The video processing system of clause 1-11, wherein the first model frame has as many pixels as the first test frame.

13. A non-transitory computer-readable data storage medium storing one or more sequences of instructions, which when executed cause one or more processors to perform any of the features recited in clauses 1-12

14. A computer program product including instructions, which when implemented on one or more processors, carries out any of the features recited in clauses 1-12.

15. A method, which when implemented on one or more processors, carries out any of the features recited in clauses 1-12.

16. A method for requesting video from a server computer to play on a client computer comprising: receiving input from a user selecting a first video title, wherein the first video title is associated with a second video title, and the first video title includes one or more common video segments with the second video title; requesting, from the server computer, a set of metadata associated with the first video title indicating one or more common segments that may be skipped; receiving the metadata associated with the first video title, and in response, requesting one or more first video chunks associated with the first video title without requesting one or more second video chunks that comprise frames included in the one or more common video segments; wherein the method is performed by one or more computing devices.

17. The method of clause 16 comprising requesting a first set of audio data associated with the one or more first video chunks, without requesting a second set of audio data associated with the one or more second video chunks.

18. The method of clause 16-17 comprising: playing video and audio associated with the first video title; applying one or more visual effects and one or more audio effects at each boundary of the one or more common segments that may be skipped.

19. A non-transitory computer-readable data storage medium storing one or more sequences of instructions which when executed cause one or more processors to perform any of the methods recited in clauses 16-18

20. A computer program product including instructions which, when implemented on one or more processors, carries out any of the methods recited in clauses 16-18.

21. A computing device having a processor configured to perform any of the methods recited in clauses 16-18.

22. A digital video distribution system comprising: a memory; one or more processors coupled to the memory; a fingerprint generation logic coupled to the one or more processors and the memory, wherein the fingerprint generation logic configured to: generate a first model fingerprint of a first video, based on pixels in a first model frame in a model segment of the first video; generate a first test fingerprint of a second video based on pixels in a first test frame; a fingerprint comparison logic coupled to the memory and the one or more processors, wherein the fingerprint comparison logic is configured to determine a first closeness value between the first model fingerprint and the first test fingerprint; a segment detection logic coupled to the memory and the one or more processors, wherein the segment detection logic is configured to determine, based on the first closeness value, the first test frame is a first boundary of a segment in the second video.

23. The digital video distribution system of clause 22, wherein the fingerprint generation logic configured to: generate a second model fingerprint of the first video, based on pixels in a second model frame in the model segment of the first video; generate a second test fingerprint of the second video based on pixels in a second test frame in the second video; wherein the fingerprint comparison logic is configured to determine a second closeness value between the second model fingerprint and the second test fingerprint; wherein the segment detection logic is configured to determine, based on the second closeness value, the second test frame is a second boundary of the segment in the second video.

24. The digital video distribution system of clause 22-23 comprising a storage coupled to the segment detection logic, wherein the segment detection logic is configured to store a set of metadata associated with the second video in the storage indicating the first test frame is the first boundary of the segment in the second video and the second test frame is the second boundary of the segment in the second video.

25. The digital video distribution system of clause 22-24 comprising a video catalog server computer coupled to the storage, wherein the video catalog server computer is configured to receive a request for metadata associated with the second video from a client video player computer, and in response, retrieve the set of metadata associated with the second video, and send the set of metadata to the client video player computer.

26. The digital video distribution system of clause 22-25, wherein the client video player computer is coupled to the video catalog server computer over one or more computer networks, and is configured to play the second video, but without requesting, downloading, or playing at least a portion of the segment in the second video identified in the set of metadata.

27. A non-transitory computer-readable data storage medium storing one or more sequences of instructions, which when executed cause one or more processors to perform any of the features recited in clauses 22-25

28. A computer program product including instructions, which when implemented on one or more processors, carries out any of the features recited in clauses 22-25.

29. A method, which when implemented on one or more processors, carries out any of the features recited in clauses 22-25.

What is claimed is:

1. A system, comprising:
a memory that stores a first image and a second image; and
a processor coupled to the memory and programmed to:
generate a first fingerprint of the first image,
generate a second fingerprint of the second image,
determine a value that indicates a level of similarity between the first fingerprint and the second fingerprint based on a ratio of a number of similar items in the first fingerprint and the second fingerprint to a total number of items in the first fingerprint and the second fingerprint, and
determine, based on the value, whether the first image matches the second image.

2. The system of claim 1, wherein the first fingerprint of the first image comprises a first color distribution based on a first plurality of pixels from the first image, and the second fingerprint of the second image comprises a second color distribution based on a second plurality of pixels from the second image.

3. The system of claim 2, wherein the first color distribution comprises a first color-component distribution based on a first color component associated with the first plurality of pixels and a second color-component distribution based on a second color component associated with the first plurality of pixels.

4. The system of claim 2, wherein the second color distribution comprises a first color-component distribution based on a first color component associated with the second plurality of pixels and a second color-component distribution based on a second color component associated with the second plurality of pixels.

5. The system of claim 1, wherein the first fingerprint of the first image comprises a plurality of color-component distributions based on the first plurality of pixels, and the second fingerprint of the second image comprises a plurality of color-component distributions based on the second plurality of pixels.

6. The system of claim 1, wherein the value is derived from a closeness vector or comprises an aggregate value.

7. The system of claim 1, wherein the first fingerprint of the first image comprises a first histogram, and the second fingerprint of the second image comprises a second histogram.

8. A method, comprising:
generating a first fingerprint of the first image;
generating a second fingerprint of the second image;
determining a value that indicates how similar the first fingerprint is to the second fingerprint based on a ratio of a number of similar items in the first fingerprint and the second fingerprint to a total number of items in the first fingerprint and the second fingerprint, and
determining, based on the value, whether the first image matches the second image.

9. The method of claim 8, wherein the first fingerprint of the first image comprises a first color distribution based on a first plurality of pixels from the first image, and the second fingerprint of the second image comprises a second color distribution based on a second plurality of pixels from the second image.

10. The method of claim 9, wherein the first color distribution comprises a first color-component distribution based on a first color component associated with the first plurality of pixels and a second color-component distribution based on a second color component associated with the first plurality of pixels.

11. The method of claim 9, wherein the second color distribution comprises a first color-component distribution based on a first color component associated with the second plurality of pixels and a second color-component distribution based on a second color component associated with the second plurality of pixels.

12. The method of claim 8, wherein the value is determined based on a number of one or more first features included in the first image and a number of one or more second features included in the second image.

13. The method of claim 12, wherein the one or more first features included in the first image comprise one or more first faces, and the one or more second features included in the second image comprise one or more second faces.

14. The method of claim 12, wherein the one or more first features included in the first image comprise one or more first characters, and the one or more second features included in the second image comprise one or more second characters.

15. A non-transitory computer-readable medium storing instructions that, when executed by a processor, cause the processor to perform the steps of:
generating a first fingerprint of the first image;
generating a second fingerprint of the second image;
determining a value that indicates how similar the first fingerprint is to the second fingerprint based on a ratio of a number of similar items in the first fingerprint and the second fingerprint to a total number of items in the first fingerprint and the second fingerprint, and
determining, based on the value, that the first image matches the second image.

16. The non-transitory computer-readable medium of claim 15, wherein generating the first fingerprint of the first image comprises identifying a first plurality of color-component distributions based on a first plurality of pixels from the first image, and generating the second fingerprint of the second image comprises identifying a second plurality of color-component distributions based on a second plurality of pixels from the second image.

17. The non-transitory computer-readable medium of claim 15, wherein determining that the first image matches the second image comprises comparing the value to a threshold value.

18. The non-transitory computer-readable medium of claim 15, wherein generating the first fingerprint of the first image comprises generating a first histogram based on a first plurality of pixels from the first image, and generating the second fingerprint of the second image comprises generating a second histogram based on a second plurality of pixels from the second image.

19. The non-transitory computer-readable medium of claim 15, wherein generating the first fingerprint of the first image comprises identifying one or more first features in the first image that define one or more first faces, and generating the second fingerprint of the second image comprises identifying one or more second features in the second image that define one or more second faces.

20. The non-transitory computer-readable medium of claim 15, wherein generating the first fingerprint of the first image comprises identifying one or more first features in the first image that define one or more first characters, and generating the second fingerprint of the second image comprises identifying one or more second features in the second image that define one or more second characters.

* * * * *